(12) United States Patent
Balber et al.

(10) Patent No.: US 10,880,336 B1
(45) Date of Patent: Dec. 29, 2020

(54) MULTIDIMENSIONAL VECTORS FOR ANALYZING AND VISUALLY DISPLAYING IDENTITY PERMISSIONS

(71) Applicant: CyberArk Software Ltd., Petach-Tikva (IL)

(72) Inventors: Michael Balber, Beerot Itshak (IL); Asaf Hecht, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/936,832

(22) Filed: Jul. 23, 2020

Related U.S. Application Data

(63) Continuation of application No. 16/857,874, filed on Apr. 24, 2020, now Pat. No. 10,749,910.

(51) Int. Cl.
| | | |
|---|---|---|
| *H04L 29/06* | (2006.01) | |
| *G06N 20/00* | (2019.01) | |
| *G06N 5/04* | (2006.01) | |

(52) U.S. Cl.
CPC ............ *H04L 63/205* (2013.01); *G06N 5/04* (2013.01); *G06N 20/00* (2019.01); *H04L 63/104* (2013.01)

(58) Field of Classification Search
CPC .............. H04L 63/205; H04L 63/104; H04L 63/00–0892; H04L 63/10–18; H04L 63/20–205; G06N 20/00; G06N 5/04
See application file for complete search history.

(56) References Cited

U.S. PATENT DOCUMENTS

| | | | |
|---|---|---|---|
| 10,264,026 B2 | 4/2019 | Barboi | |
| 10,341,430 B1 | 7/2019 | Badawy et al. | |
| 10,432,639 B1* | 10/2019 | Bebee | ............... G06F 16/90335 |
| 10,447,727 B1 | 10/2019 | Hecht | |
| 10,607,015 B1 | 3/2020 | Hecht | |
| 10,715,507 B1* | 7/2020 | Spears | ................... G06Q 20/08 |
| 2011/0239276 A1 | 9/2011 | Garcia Garcia | |
| 2017/0116552 A1 | 4/2017 | Deodhar | |
| 2017/0171208 A1 | 6/2017 | Purushothaman | |
| 2017/0257377 A1 | 9/2017 | Vading | |
| 2018/0159928 A1 | 6/2018 | Jin | |
| 2018/0248879 A1* | 8/2018 | Zhang | ................. H04L 63/1458 |
| 2019/0108353 A1 | 4/2019 | Sadeh | |

FOREIGN PATENT DOCUMENTS

WO      WO-0175724 A1    10/2001

OTHER PUBLICATIONS

SailPoint to be Granted Patent for Application of Artificial Intelligence and Machine Learning to Predictive, Seeking Alpha, https://seekalpha.com/pr/17527199-sailpoint-to-be-granted-patent-for-application-of-artificial-intelligence-and-machine (May 29, 2019).

* cited by examiner

*Primary Examiner* — Sarah Su
(74) *Attorney, Agent, or Firm* — Finnegan, Henderson, Farabow, Garrett & Dunner LLP

(57) ABSTRACT

Disclosed embodiments relate to systems and methods for multidimensional vectors for analyzing and visually displaying identity permissions. Techniques include identifying a plurality of identities, privileges used by the identities, and data associated with the identities, developing privilege vectors based on the identified information, and generating groupings of the identities based on the privilege vectors. Further techniques include generating a group score for an identity grouping, using the group score to determine if the grouping is a least privilege grouping, and updating the privileges of the identities within the grouping.

20 Claims, 5 Drawing Sheets

Exemplary Vector Format:
Identity X: [p1 p2 p3 p4 p5 p6; t1 t2 t3] ~220

Exemplary Identity Vectors:

Identity A: [1 1 1 0 0 0 1 0 0] ~230

Identity B: [1 1 0 1 0 0 0 1 0] ~240

Identity C: [0 0 0 0 1 1 1 0 1] ~250

Identity D: [0 0 0 0 1 1 0 0 1] ~260

Identity E: [0 0 0 0 0 0 0 1 0] ~270

Identity F: [0 0 1 0 0 0 1 0 0] ~280

| Grouping | 1 | 2 | 3 | 4 | 5 | 6 | 7 | 8 | 9 | 10 | 11 | 12 |
|---|---|---|---|---|---|---|---|---|---|---|---|---|
| A | USED | USED | USED | - | - | - | - | - | - | - | - | - |
| B | USED | USED | - | USED | - | - | - | - | - | - | - | - |
| C | - | - | - | - | USED | USED | USED | - | - | - | - | - |
| D | - | - | - | - | USED | USED | - | USED | - | - | - | - |
| E | - | - | - | - | - | - | - | - | USED | USED | USED | - |
| F | - | - | - | - | - | - | - | - | USED | USED | - | USED |

FIG. 5A

Exemplary Group Score Formula:

$$Group\ Score = \frac{\sum \frac{\sum p}{N}}{M} \sim 510$$

Exemplary Groupings and Group Scores:

Grouping 1: A, B, C, D, E, F: $\frac{\frac{3}{12}+\frac{3}{12}+\frac{3}{12}+\frac{3}{12}+\frac{3}{12}+\frac{3}{12}}{6} = 0.25 \sim 520$ Grouping 2: A, B, C, D: $\frac{\frac{3}{8}+\frac{3}{8}+\frac{3}{8}+\frac{3}{8}}{4} = 0.375 \sim 530$ Grouping 3: A, B: $\frac{\frac{3}{4}+\frac{3}{4}}{2} = 0.75 \sim 540$

FIG. 5B

MULTIDIMENSIONAL VECTORS FOR ANALYZING AND VISUALLY DISPLAYING IDENTITY PERMISSIONS

CROSS-REFERENCE TO RELATED APPLICATIONS

This application is a continuation of U.S. patent application Ser. No. 16/857,874, filed on Apr. 24, 2020, which is currently pending. The aforementioned application is incorporated herein by reference in its entirety.

BACKGROUND

Computer systems often include a variety of secure resources to which access is limited in order to improve system security. Access to such resources is often managed using identities, which are granted specific permissions or privileges to access, edit, or utilize the secure resources. While restricting access to secure resources using permissions may improve the security of a system, the identities and permissions may become cumbersome to manage in large or dynamically changing systems.

In some cases, attackers may attempt to gain access to an identity's credentials, and then use the credentials to mount a larger attack on the system. Thus, identities with a large number of assigned permissions, and identities with highly sensitive permissions, may provide an increased attack surface for malicious actors. It may be desirable to limit the privileges assigned to each identity to only those permissions actually needed by the identity to function. Thus, if the identity is compromised, the potential for damage to be inflicted by the compromised identity is limited. Manual grouping of identities has been attempted, but manual grouping may be difficult to implement effectively for large systems with many identities. Existing techniques are not optimal for real world, dynamic computing environments because they may not dynamically update identity groups as circumstances change. Moreover, existing techniques may not minimize the system's attack surface by creating least-privilege groups of identities.

Accordingly, in view of these and other deficiencies, technological solutions are needed for analyzing and grouping identities for improved identity and permission management. Solutions should group similar identities together so that permissions for multiple identities may be managed simultaneously. Solutions should group be able to create least-privilege groups and update the privileges of identities within the groups. As discussed further below, solutions may implement machine learning techniques to automate and optimize groupings of identities. Solutions may also generate visual representations of groupings for improved system analysis.

SUMMARY

The disclosed embodiments describe non-transitory computer readable media, systems, and methods for developing multidimensional vectors for analyzing and visually displaying identity permissions. For example, in an exemplary embodiment, there may be a non-transitory computer readable medium including instructions that, when executed by at least one processor, may cause the at least one processor to perform operations for developing customized and multifactor vectors representing privileges of network identities. The operations may comprise identifying a plurality of network identities; identifying, for a plurality of privileges, whether the plurality of privileges have been actually used by the plurality of network identities over a period of time; identifying identity data associated with the plurality of network identities, the identity data indicating one or more attributes of the plurality of network identities; developing, based on whether the plurality of privileges have been actually used by the plurality of network identities over the period of time and on the identity data, a plurality of multidimensional privilege vectors for the plurality of network identities, each of the plurality of multidimensional privilege vectors corresponding to an identity from the plurality of network identities and expressing at least: whether each identity actually used the plurality of privileges over the period of time, and the one or more attributes of each identity; and generating, based on the plurality of multidimensional privilege vectors, a first grouping comprising a subset of the plurality of network identities; wherein the first grouping may assigns the subset of the plurality of network identities with updated privileges, based on a least-privilege policy, that are different from existing allowed privileges of the subset of the plurality of network identities.

According to a disclosed embodiment, the first grouping and a second grouping of the plurality of network identities may be generated using a supervised machine learning technique, the supervised machine learning technique using as an input one or more of the plurality of privileges; the first grouping may be determined by the supervised machine learning technique to have a similar actual use of the plurality of privileges over the period of time; and the second grouping may be determined by the supervised machine learning technique to have a similar actual use of the plurality of privileges over the period of time.

According to a disclosed embodiment, the operation of identifying the plurality of network identities may be dynamically configurable to allow different compositions of network identities.

According to a disclosed embodiment, the plurality of multidimensional privilege vectors may be expressed as arrays of binary values.

According to a disclosed embodiment, the first grouping may be based at least in part on metadata associated with the plurality of network identities.

According to a disclosed embodiment, the existing allowed privileges may be based on privileged group memberships.

According to a disclosed embodiment, the updated privileges may be based on privileged group memberships.

According to a disclosed embodiment, the plurality of network identities may correspond to one of: user accounts, application-based identities, or code-based identities.

According to a disclosed embodiment, the operations may further comprise identifying, in a separate network environment, a separate plurality of network identities; and identifying, in the separate network environment, a second grouping of a subset of the separate plurality of network identities determined to be similar to the first grouping.

According to a disclosed embodiment, the operations may further comprise applying the updated privileges of the first grouping to the second grouping.

According to another disclosed embodiment, a method may be implemented for developing customized and multifactor vectors representing privileges of network identities. The method may comprise identifying a plurality of network identities; identifying, for a plurality of privileges, whether the plurality of privileges have been actually used by the plurality of network identities over a period of time; identifying identity data associated with the plurality of network identities, the identity data indicating one or more attributes of the plurality of network identities; developing, based on whether the plurality of privileges have been actually used by the plurality of network identities over the period of time and on the identity data, a plurality of multidimensional privilege vectors for the plurality of network identities, each of the plurality of multidimensional privilege vectors corresponding to an identity from the plurality of network identities and expressing at least: whether each identity actually used the plurality of privileges over the period of time, and the one or more attributes of each identity; and generating, based on the plurality of multidimensional privilege vectors, a first grouping comprising a subset of the plurality of network identities; wherein the first grouping may assign the subset of the plurality of network identities with updated privileges, based on a least-privilege policy, that are different from existing allowed privileges of the subset of the plurality of network identities.

According to a disclosed embodiment, the plurality of multidimensional privilege vectors for the plurality of network identities may correspond to a first network environment, and the method may further comprise developing a second plurality of multidimensional privilege vectors for a second plurality of network identities in a second network environment.

According to a disclosed embodiment, the method may further comprise developing a recommendation to apply the updated privileges from the first network environment to the second network environment.

According to a disclosed embodiment, the method may further comprise outputting the updated privileges to a supervised machine learning system, the supervised machine learning system may be configured to iteratively perform at least the steps of developing the plurality of multidimensional privilege vectors for the plurality of network identities and generating additional groupings assigning additional subsets of the plurality of network identities with updated privileges.

According to a disclosed embodiment, the method may further comprise developing a group score for the first grouping, the group score being based on an average of actually used permissions by the first grouping.

According to a disclosed embodiment, the method may further comprise designating the first grouping as a least-privilege subset if the group score is above a threshold score.

According to a disclosed embodiment, the method may further comprise subdividing the first grouping if the group score is above a threshold score.

According to a disclosed embodiment, the plurality of multidimensional privilege vectors are sets of numerical values.

According to a disclosed embodiment, the plurality of multidimensional privilege vectors may be sets of numerical values.

According to a disclosed embodiment, the method may further comprise repeating over time the step of developing the plurality of multidimensional privilege vectors for the plurality of network identities; and determining a trend in at least one of the plurality of multidimensional privilege vectors associated with a first identity from the plurality of network identities.

According to a disclosed embodiment, the method may further comprise adjusting the updated privileges associated with the first identity based on the determined trend.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 5A is an illustration depicting exemplary permission assignments in accordance with disclosed embodiments.

FIG. 5B is an illustration depicting exemplary group scores vectors in accordance with disclosed embodiments.

DETAILED DESCRIPTION

Figure 1:
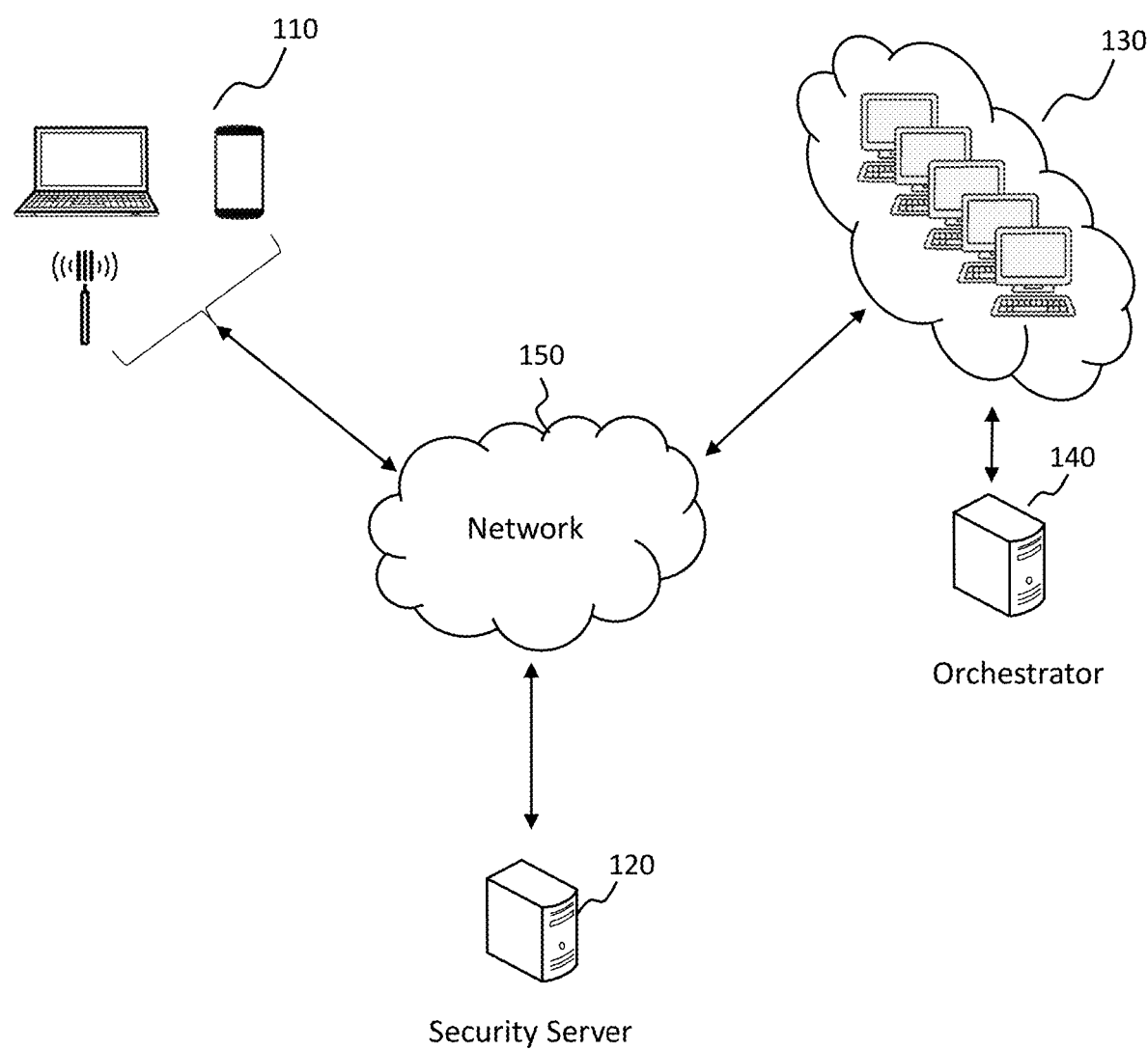
FIG. 1 is a block diagram of an exemplary system for developing customized and multifactor vectors representing privileges of network identities in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of developing multidimensional privilege vectors for analyzing and displaying identity permissions described herein overcome several technological problems relating to the management of permissions and security of computing systems. As described below, the disclosed embodiments provide techniques for a security server to identify identities within a computing environment, generate privilege vectors associated with the identities, and group the identities based on the privilege vectors. In some embodiments, the generation of the vectors and the grouping of the identities may be conducted by a machine learning system. Disclosed embodiments may also update the privileges assigned to grouped identities and may permit streamlined analysis of and privilege assignment to multiple identities within a computing environment.

A computer system may contain a variety of identities associated with human users, applications, virtual instances, or code instances. To protect secure resources within the system, such as applications, storage resources, etc., the identities may be assigned privileges or permissions that permit the identities to take action on the secure resources. For example, privileges may permit the identity to read data, write or edit data, access an application, or create new identities. Some systems may group identities together to simplify management of multiple identities because an administrator does not need to manage permissions of each identity individually. However, simply grouping identities together can present issues through, for example, unnecessary assignment of privileges to certain identities.

Disclosed embodiments facilitate grouping of privileges into least-privilege groupings for both streamlined privilege management and improved system security. Disclosed embodiments may divide identities associated with an environment into the smallest number of new groups that are better correlated with the permissions that are actually required for the identities. Creating these least-privilege groups may permit an administrator to more effectively manage an environment with many identities with varying scopes of privileges.

Disclosed embodiments may also update or provide recommendations for updating identity privileges. In some embodiments, comparisons may be drawn between different environments, improving the privilege grouping and permissions updating processes.

Reference will now be made in detail to the disclosed embodiments, examples of which are illustrated in the accompanying drawings.

FIG. 1 is a block diagram of an exemplary system 100 for developing customized and multifactor vectors representing privileges of network identities in accordance with disclosed embodiments. System 100 may include one or more computing device 110, security server 120, virtual computing platform 130, orchestrator 140, and network 150, as shown in FIG. 1 and discussed further below.

Computing device 110 may include a variety of different types of computing devices. For example, computing device 110 may be a personal computer (e.g., a desktop or laptop), an IoT device (e.g., sensor, smart home appliance, printer, connected vehicle, industrial device, etc.), a server, a virtual machine (e.g., virtualized computer, container instance, etc.), or similar. Computing device 110 may also be a handheld device (e.g., a mobile phone, a tablet, notebook, digital camera, etc.), a wearable device (e.g., a smart watch, smart jewelry, an implantable device, a fitness tracker, smart clothing, a head-mounted display, etc.), or various other devices capable of processing and/or receiving data.

In some embodiments, computing device 110 may include or be in communication with various computing resources, storage resources, security services, developer tools, analytics tools, and the like implemented on the cloud using a virtualization tool provided by, for example, Amazon Web Services™ (AWS™) Microsoft Azure™ IBM Cloud™, Google Cloud Platform™ Cisco Metapod™, Joyent™ vmWare™ or others. As an example, AWS™ provides many varying cloud services including searching/analytics (e.g., CloudSearch™), virtual servers (e.g., EC2™), media services (e.g., MediaConvert™), database services (e.g., Aurora™), storage (e.g., S3™), and others.

In accordance with disclosed embodiments, computing device 110 may be associated with one or more identities. An identity may correspond to, for example, a human user, user account, application, or code instance. Each identity may be associated with one or more permissions, which may permit an identity access to restricted resources, execute code on a restricted resource, access or edit certain data, create new permissions or identities, or execute other actions.

System 100 may also include a security server 120 as shown in FIG. 1. Security server 120 may be a proxy server or centralized server that manages the different components of system 100. In some embodiments, as described in greater detail below, security server 120 may be configured to identify and classify identities that may be associated with various components of system 100. Security server 120 may also be configured to manage identities and their assigned privileges. In some embodiments, security server 120 may implement security controls on one or more of the elements of system 100. For example, security server 120 may implement security policies for managing identities and associated permissions. In some embodiments, security server 120 may also manage security threats to system 100. In some embodiments, security server 120 may include a storage device for storing identities, associated permissions, and their identity groupings. The storage device may be, for example, local storage, a database, or a cloud storage service.

Virtual computing environment 130 may include one or more virtual machines or virtualized instances, which may be based on virtualization tools provided by Amazon Web Services™ (AWS™), Microsoft Azure™, IBM Cloud™, Google Cloud Platform™, Cisco Metapod™ Joyent™, vmWare™ or others. Virtual computing environment 130 may include various computing resources, storage resources, security services, developer tools, analytics tools, applications, databases, software code, files, or various other types of resources. While, in some embodiments, virtual resources within virtual computing environment 130 may exist entirely in the cloud, in some embodiments the virtual resources may have real-world devices that they are associated with.

Virtual computing environment 130 may include various entities, machines, resources, or services that are associated with various policies or have various permissions. The permissions may be used by resources within virtual computing environment 130 to access other resources within virtual computing environment 130, computing device 110, security server 120, or other external computing resources. Such access may require authentication, for example, through the use of a privileged credential (e.g., password, SSH key, symmetric (e.g., public/private) key, or other type of cryptographic data or privileged access token). While virtual computing network 130 is described here as being based on virtual computing platform architecture, in some embodiments it may be in whole, or in part, based on on-premises (e.g., local corporate) networks. Accordingly, virtual computing network 130 may be entirely on-premises, entirely cloud-based, or both (e.g., hybrids). Of course, while system 100 is illustrated in FIG. 1 as including a single virtual computing environment 130, in some embodiments, there may be additional virtual computing environments. In other embodiments, system 100 may not include a virtual computing environment 130.

Virtual computing environment 130 may be in communication with cloud orchestrator 140. Orchestrator 140 may communicate with the different entities or components of cloud computing environment 130 to configure and deploy cloud computing services. In various embodiments, orchestrator 140 may be based on a variety of cloud management platforms such as AppFormix™, BMC Cloud LifeCycle Management™, IBM Cloud Orchestrator™, AWS CloudFormation™, Apache CloudStack™, Kubernetes™, or others. In some embodiments, orchestrator 140 may instantiate (e.g., spin up) instances and monitor activity in cloud computing environment 130. For example, orchestrator 140 may monitor (or control) the spinning up of new virtual instances, may provide elevated or reduced privileges to virtual instances, may request elevated or reduced privileges for virtual instances, may monitor use of privileged credentials by (or to) virtual instances, may delete or disable instances, and may perform other operations in cloud computing environment 130.

Computing device 110, security server 120 and virtual computing environment 130 may communicate through network 150. Communications over network 150 may occur across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, network 150 may be a cloud network, (e.g., private cloud, public cloud, or hybrid cloud network), or a combination of these types of networks. In some embodiments, the communications may take place across two or more of these forms of networks and protocols.

Figures 2A, 2B:
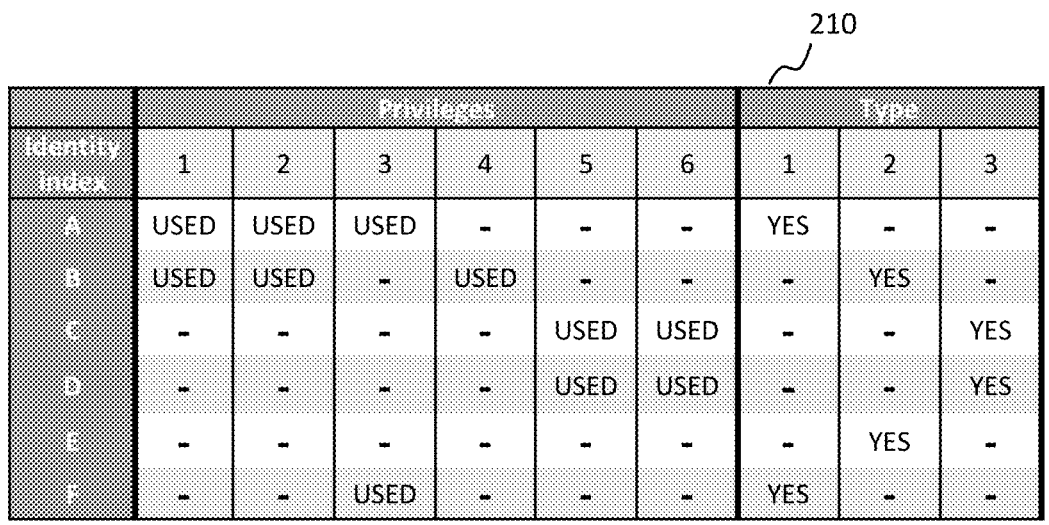
FIG. 2A is an illustration depicting exemplary identity permissions and attributes in accordance with disclosed embodiments.
FIG. 2B is an illustration depicting exemplary vectors in accordance with disclosed embodiments.

FIG. 2A is an illustration depicting exemplary identity permissions and attributes in accordance with disclosed embodiments. As described above, virtual computing environment 130 or computing device 110 may be associated with various identities. The identities may correspond to human users, machines, software applications, virtual instances, code-based identities, etc. Each identity may be associated with one or more privileges. Privileges may, for example, permit an identity access to restricted resources, execute code on a restricted resource, access or edit certain data, or create new permissions or identities. Privileges 1-6 illustrated in FIG. 2A may each correspond to a different action that an identity may be permitted to take on particular resource (e.g., read, write, delete, change permissions, create identities, etc.).

Identities also may have various other corresponding attributes, such as the type of identity, groups membership, access to specific target resources, roles, age of identity, and the like. FIG. 2A includes a type of identity attributes. Types may define whether the identity is associated with a human user, an application, a service or organization, a serverless code instance, a virtual instance, an account associated with an entity, etc.

Chart 210 shows exemplary identities A-F and their associations with exemplary permissions 1-6 and exemplary identity types 1-3. For example, identity type 1 may indicate that the identity is a human user, identity type 2 may indicate that the identity is associated with an application, and identity type 3 may indicate that the identity the identity is associated with a particular cloud computing service. Each box of chart 210 indicates whether a certain identity has used a given permission or is of a given type. In the example of chart 210, Identity A has used permissions 1, 2, and 3, but has not used permissions 4-6, and is of type 1. By contrast, Identity F is of type 1, but has only used permission 3.

FIG. 2B is an illustration depicting exemplary vectors 220-280 in accordance with disclosed embodiments. Each exemplary vector may be associated with an identity. Each vector may also indicate which permissions the associated identity has actually used and the type of the identity. A vector may be an array of binary values, with a "1" indicating that a corresponding privilege had been used or the identity is of the corresponding type. An array location with a "0" may indicate that a privilege has not been used or the identity is not of the corresponding type. For example, vector 240 indicates that user B has used privileges 1, 2, and 4, and is of type 2.

While vectors are depicted in FIG. 2B as 1×9 arrays, vectors could take other forms. For example, a vector may be a 2×6 array, with the first row corresponding to the used privileges and the second row corresponding to the identity type.

Of course, vectors are not limited to including used privileges and types. For example, vectors may indicate the privileges that an identity has, regardless of whether or not the privileges have actually been used. Vectors may include other attributes of identities, such as the types of target resources the identity may act on, if the identity uses multi-factor authentication, geographic location of the identity, a previous group of the identity, role title, manager of the identity, and the like. In some embodiments, vectors may include attributes of target resources, such a type of the resource, a security level of the resource, or the size of the resource.

Figure 3:
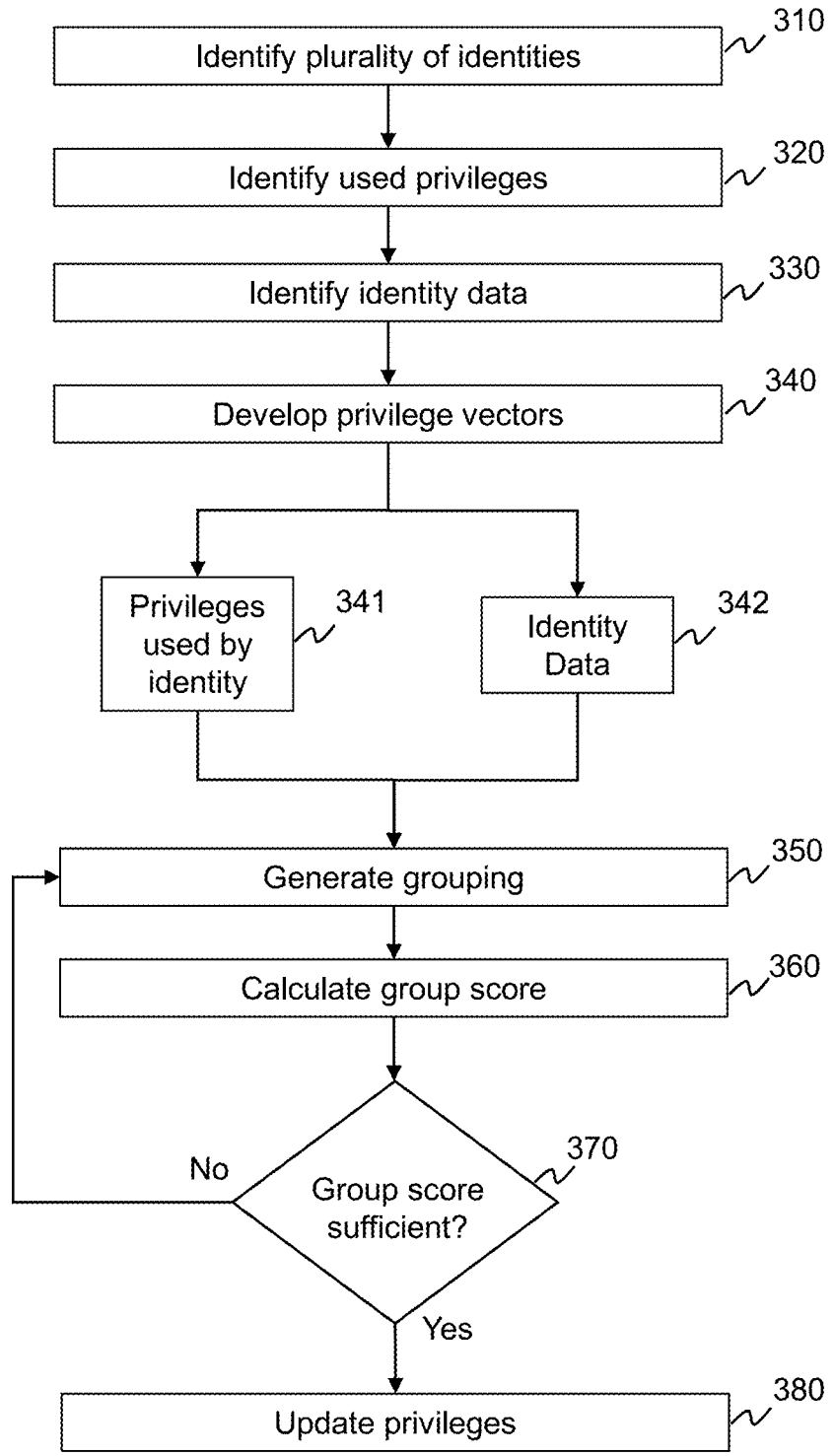
FIG. 3 is a flowchart depicting an exemplary process for developing customized and multifactor vectors representing privileges of identities in accordance with disclosed embodiments.

FIG. 3 is a flowchart depicting an exemplary process 300 for developing customized and multifactor vectors representing privileges of identities in accordance with disclosed embodiments. Process 300 may be performed by, for example, security server 120 or orchestrator 140.

At step 310, process 300 may include identifying a plurality of network identities. As described above, identities may be associated with, for example, human users, user accounts, applications, virtual instances, organizations, or code instances. System 100 may include a variety of identities to be identified by security server 120. For example, computing device 110 may have one or more associated identities. An identity may also be associated with an application being executed on virtual computing environment 130. Virtual computing environment 130 may also include specific virtual instances associated with one or more identities. Each identity may be associated with one or more privileges. As described above, the privileges may permit the identity to take various actions or access certain secure resources.

Security server 120 may identify identities by determining which identities are associated with a given environment. In some embodiments, security server 120 may store identity listings, such as a network directory, associated with certain environments, networks, systems, departments, resources, etc. In some embodiments, the identity listings may be stored locally on security server 120. Identity listings may also be stored remotely from security server 120, in for example, a database or secure cloud storage resource as described above. In some embodiments, the identifying of step 310 may be dynamically configurable to allow different compositions of network identities. For example, security server 120 may be dynamically configured to identify identities associated with a specific environment, network, resource, organization, or department. As another example, security server 120 may be dynamically configured to identify certain identities or types of identities across multiple environments, networks, resources, organizations, or departments, such as identities of certain types contained within different departments of a single organization (e.g., all administrator identities within an IT department, an R&D Departments, and a legal department of a company's system). Of course, multiple identities may also be identified across multiple different organizations or environments.

At step 320, process 300 may include identifying, for a plurality of privileges, whether the privileges have been actually used by the plurality of network identities. Each identity identified in step 310 may be associated with one or more privileges. As described above, privileges may permit the identity to take certain actions within an environment. In some cases, an identity's existing allowed privileges may be based on privileged group memberships. For example, an organization may make each identity a member of one of several preexisting privilege groups within the system. Each member of a privilege group may be assigned the same privileges. As discussed below, identities may be assigned to different groups and new groups may be created, which may facilitate assignment of updated privileges to identities.

An identity associated with multiple privileges may have used all of the privileges, a subset of the privileges, or none of them. Identifying whether privileges have been actually used may be based on an assessment of one or more parameters associated with the use of permissions. The criteria for whether a permission is considered unused may be configurable by the system, for example, by security server 120. In some embodiments, security server 120 may determine that a permission is unused if the permission has not been used before at all. In further embodiments, process 300 may determine that a permission is unused if the permission has not been used with a certain period of time. As an example, if a permission has not been used in the previous 3 months, process 300 may consider the permission unused. In some embodiments, the determination of whether a permission is used may be indicated by a usage status of the permission. The usage status may be a binary value (i.e., either 1 or 0, or either yes or no) indicating that the permission is either used or unused. In other embodiments, the usage status may be a sliding scale that indicates how much or how often the permission is used (e.g., a scale of 1 to 10, with 1 being never used and 10 being used very frequently). In such embodiments, the system may a set threshold value to determine if a permission is used or unused. For example, a system may set a threshold of 4, meaning that any permission having a usage status value of less than 4 is considered unused.

At step 330, process 300 may include identifying identity data associated with the plurality of network identities. Identity data may include a variety of types of data associated with an identity. In some embodiments, the identity data may indicate one or more attributes of the plurality of network identities. The attributes may include, for example, a type of the identity, group membership, access to specific target resources, roles, age of identity, the types of target resources the identity may act on, if the identity uses multi-factor authentication, a geographic location of the identity, a previous group of the identity, a role title of the identity, a manager of the identity, and the like. As an example, types may define whether the identity is associated with a human user, an application, a service or organization, serverless code instance, virtual instance, an account associated with an entity, etc. As another example, identities may be assigned certain roles, such as administrator, manager, or member.

Attributes may also include information relating to actions executed by the identity. This information may include, for example, the resource the action was executed on, a privilege level of the resource, the time of the performed action, the duration of the action, and the number of times the action was executed.

In some embodiments, the identity data may include data relating to the target resources associated with the one or more privileges assigned to the identified identity. For example, a type of the resource, a security level of the resource, or the size of the resource.

At step 340, process 300 may include developing a plurality of multidimensional privilege vectors for the plurality of network identities. A privilege vector may be developed for each identity identified at operation 310. In some embodiments, security server 120 may develop a vector for each identity associated with a particular device, network, application, organization, environment, etc. A privilege vector may be developed based on whether the privileges associated with an identified identity were actually used by the identity. Privilege vectors may also be developed based on the identity data identified at operation 330. Multidimensional privilege vectors may take various forms, as illustrated by FIGS. 2A and 2B. Each privilege vector may express one or more privileges 341 used by the identity. In other words, the privilege vector may express whether the corresponding identity used each of its privileges. In some embodiments, privilege vectors may be developed such that each privilege represented by the vector was actually used by at least one identity for which a vector was created. In other words, privileges not used by any identities may not be represented in the developed vectors for identities within the environment. Each privilege vector may also express identity data 342 corresponding to the identity (e.g., attributes of the identity). For example, a portion of the vector may correspond to different attributes that may be associated with the identity (e.g., a type, group, specific resource, group membership, or location).

As illustrated in FIG. 2B, a privilege vector may indicate in a binary format (e.g., 0 or 1, or Yes or No), whether each privilege associated with an identity has been used. The privilege vector may also indicate in a binary format, whether certain attributes are associated with the identity. For example, the vector may indicate that a vector is of a certain type by containing a "1" in the vector position corresponding to the particular identity type. Privilege vectors are not limited to arrays in a binary format. For example, privilege vectors may comprise sets or arrays of other numerical values, such as hexadecimal.

In some embodiments, multiple privilege vectors may be generated for a single identity. For example, each privilege vector may include a different attribute or combination of attributes. As discussed in greater detail below, the different privilege vectors may be used to generate different groupings of identities.

At step 350, process 300 may include generating a grouping of identities. A grouping of identities may comprise a subset of the identities identified in operation 310. Groupings may be developed based on the multidimensional privilege vectors developed in operation 340.

Groupings can be created based on or more of the pieces of data contained within a privilege vector (e.g., groupings may be created based only on used privileges, or other groupings may be created based on both used privileges and an attribute). If a privilege vector contains information relating to multiple attributes, the groupings may be created based on all of the attributes or a subset of the attributes. For example, for a set of identities, privilege vectors may be generated that contain information on the privileges used by the identities, the type of the identities, the roles of the identities, and the geographic location of the identity. Based on these vectors, groupings may be generated based on the used privileges and all three of the included attributes. However, other groupings may be generated based on the used privileges and the geographic locations of the identities, but not the types or roles. As explained in greater detail below, each grouping may contain a different combination of identities that may have similar privileges, scopes of privileges, used privileges, potential effects on a given system, etc. For example, a grouping may be created such that its constituent identities have a similar actual use of certain privileges over a period of time.

In some embodiments, groupings may be created based on grouping criteria. Different grouping criteria may be predefined and stored on security server 120. Grouping criteria may also be dynamically defined or updated over time. Grouping criteria may define the identity data upon which to base groupings. In some embodiments, grouping criteria may define a set or type of privilege vectors to be used to generate groupings. For example, in a system in which each identity corresponds to multiple privilege vectors including different combinations of attributes, a grouping criterion may define that groupings are to be developed based on a set of privilege vectors containing information about the identity type and the types of target resources the identity may act upon. Alternatively, or additionally, grouping criteria may identify subsets of attributes within privilege vectors on which to base development of groupings. For example, a system may have privilege vectors containing information about six different privilege attributes. A corresponding grouping criterion may identify four of the six attributes on which to base grouping development.

Groupings may be developed by security server 120 using a machine learning tool. For example, a machine learning technique may be used to classify or cluster data within privilege vectors into groupings. The machine learning technique may use one of a variety of different machine learning algorithms, either supervised or unsupervised. In some embodiments, the machine learning technique may be a supervised machine learning method. For example, the supervised machine learning algorithm may be one of a variety of algorithms such as a neural network, a decision tree classifier, Naïve Bayes classifier, or Random Forest classifier. The supervised machine learning method may be implemented by providing the algorithm with a set of training data comprising training privilege vectors that are pre-classified into predetermined groupings. The supervised machine learning method may be trained to classify privilege vectors into groupings using the training data. Then, the supervised machine learning method may be implemented to create groupings by receiving privilege vectors, e.g., those developed in operation 340, as input. The supervised machine learning method may then evaluate each privilege vector based on the data within the privilege vector (e.g., used privileges and/or attributes) and classify the corresponding identity into one of the predetermined groupings.

In some embodiments, the machine learning technique may be an unsupervised machine learning method. For example, the machine learning technique may be one of a variety of clustering algorithms, such as K-means clustering, mean-shift clustering, Gaussian mixture models, or DBSCAN. The unsupervised machine learning method may receive privilege vectors (developed in operation 340) as input, analyze the vectors, and cluster the corresponding identities into groupings based on similarities between their vectors. In some embodiments, the unsupervised machine learning method may be configured to cluster the identities into a predetermined set of groupings. In other embodiments, the machine learning method may dynamically determine the number of groupings based on its analysis of the input privilege vectors. In some cases, this may provide a larger number of groupings, but it may facilitate finer control of privileges because the identities within each grouping may be more closely related.

Regardless of the type of machine learning algorithm used, the machine learning tool may be configured to group identities together such that the grouped identities contain similar privileges, used privileges, scopes of privileges, etc. In some embodiments, the groupings may be based on metadata associated with the identities. This metadata may or may not be included in the privilege vectors developed in operation 340. Metadata may relate to properties of identities outside of the privileges that the identity has actually used. For example, the identity metadata may include data relating to whether the identity has MFA, whether the identity is a human user or a software application, the types of target resources the identity may take actions upon, geographic location of the identity, previous group of the identity, who is the direct manager of the identity, role title of the identity, and the like. The metadata may improve the effectiveness of groupings.

In some embodiments, the machine learning technique may be dynamically updated over time. For example, the machine learning algorithm may be fed updated training data with revised group assignments for certain identities. As another example, a user may provide feedback regarding the generated groupings to security server 120. Security server 120 may receive feedback and use it to update the machine learning tool. In some embodiments, the machine learning technique may be implemented at periodic intervals to generate new groupings. The new groupings may be compared to previous groupings to determine if the groupings change. The changes in the groupings may then be used to update the machine learning tool.

In some embodiments, the machine learning technique may provide a set of recommended groupings. An administrator may then review the recommended groupings and select a grouping to be implemented. The recommended groupings may be provided at the request of the administrator, or new recommended groupings may be provided at regular intervals. The recommended groupings may correspond to privilege update recommendations described below with respect to operation 380. The recommended groupings, whether selected or unselected, may be stored by security server 120, locally or in a connected storage device, as described above with respect to FIG. 1. Security server 120 may be configured to analyze the stored recommended groupings and use the analysis to develop parameters that may improve future groupings. For example, security server 120 may recognize that the administrator typically does not select a set of recommended groupings when the groupings are of a certain size (e.g., when one group encompasses too many or too few identities). Accordingly, security server 120 may avoid generating groupings of that size in the future. In some embodiments, security server 120 may generate recommended actions based on the analysis. For example, security server 120 may generate an alert if a certain identity was previously routinely classified into a particular grouping, but upon generation of new groupings was in a different grouping. Such a difference may occur if, for example, the identity was compromised by an attacker and as a result had a significant change in used privileges. Accordingly, security server 120 may generate an alert regarding the potential security breach, which may be provided to computing device 110, orchestrator 140, or an administrator. As another example, security server 120 may use changes in an identity's grouping to recognize when users have changed roles, moved departments, or left the company.

In some embodiments, security server 120 may be configured to implement security measures in response to a security breach or potential breach. For example, if security server 120 recognizes that an identity has been compromised, it may suspend or revoke the identity's privileges.

In some embodiments, the decision of whether or not to recommend new groupings may be based on a difference score. A difference score may be generated that quantifies the differences between existing groupings and new groupings. For example, a large difference in the identities within a grouping or a change in identities with highly sensitive privileges may result in a large difference score. Conversely, groupings that differ only by one identity with a limited scope of privileges may result in a low difference score. A difference score threshold may indicate if two groupings are sufficiently different for the security server 120 to recommend the new grouping or recommend leaving the old grouping in place. The difference score threshold may be set manually by an administrator or may be dynamically set by, for example, a machine learning tool. If the difference score does not exceed the threshold, security server 120 may not recommend that the grouping be updated. If the difference score does exceed the threshold, security server 120 may recommend that the grouping be updated, or it may automatically update the grouping. This may be desirable in embodiments where new grouping recommendations are generated on a regular basis. For example, even if security server 120 runs a machine learning tool once per week, the organization may not want to receive new grouping recommendations every week. By implementing a difference score threshold, security server 120 will only recommend updating the groupings when significant changes are present. In some embodiments, the group score calculated at step 360 and described in greater detail below may be used to evaluate the differences between groupings.

In some embodiments, groupings may be developed for a subset of identities within an environment such as organization, a department of an organization, or a separate system or a network. Grouping generation may be conducted according to a "dynamic scope." The scope may identify the environment or portion of an environment for which identities are to be grouped. For example, groupings may be generated for all identities within an organization. However, a smaller scope of groupings may be generated for a subset of the organization. As an example, groupings may be specifically generated for all identities within a legal department or with a research and development division. In some embodiments, the scope of generated groupings may be controlled by varying the identities identified at step 310.

In some embodiments, security server 120 may use previously recommended groupings and other related stored data (user selections, security breaches, etc.) to analyze other environments. For example, security server 120 may use data collected with respect to one area of an organization to influence future groupings within other areas of the same organization. As another example, security server 120 may be part of a service (for example, a cloud based identity management service) that manages identities for multiple different organizations. Accordingly, security server 120 may use data from one organization (e.g., a first bank) to influence the grouping development for another organization (e.g., a second bank). Security server 120 may be configured to identify separate pluralities of identities from different environments, and develop separate pluralities of privilege vectors for the different environments. Security server 120 may generate a first grouping for the first environment, then generate a second grouping for the second environment that is similar to the first grouping. As described in greater detail below with respect to operation 380, security server 120 may apply the updated privileges of the first grouping to the second grouping.

Figure 4:
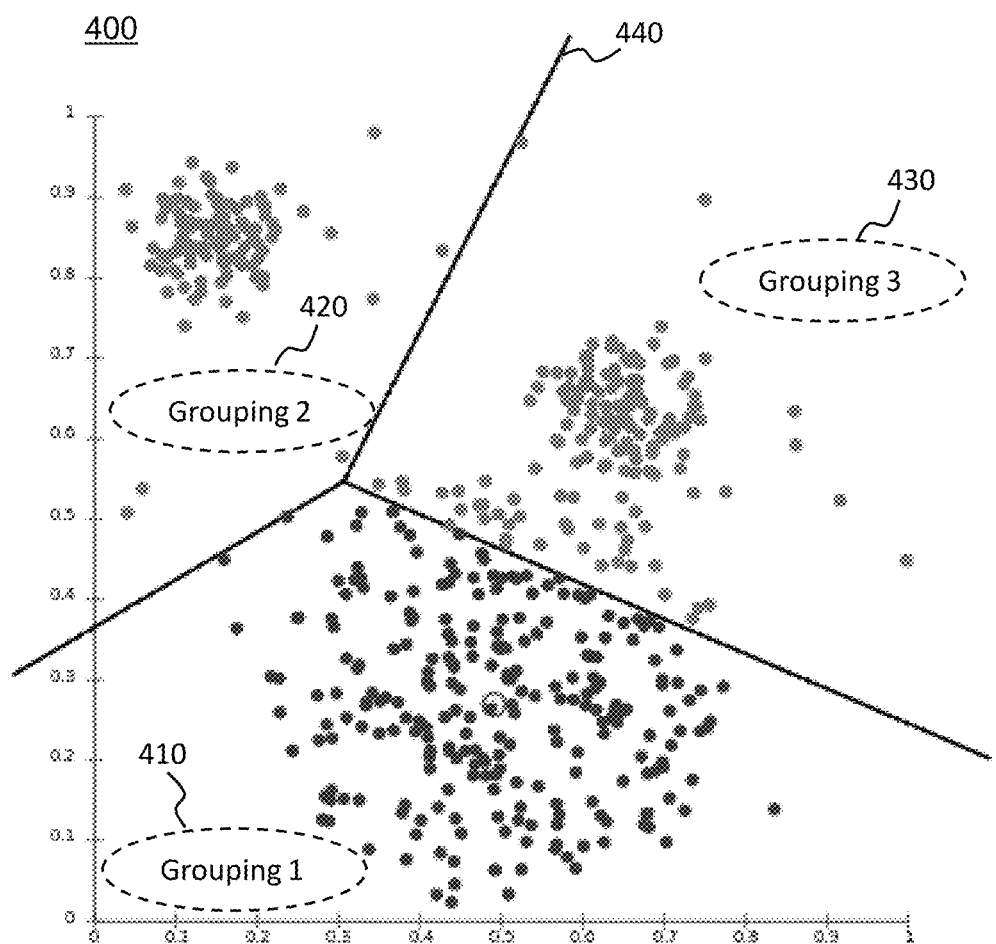
FIG. 4 is an illustration depicting exemplary identity groupings in accordance with disclosed embodiments.

In some embodiments, step 350 may include generating a visual representation of groupings. Visual representations may include, for example, graphs or charts illustrating the distribution of identities among various groupings. FIG. 4 is an illustration depicting an exemplary visual representation identity groupings in accordance with disclosed embodiments. Plot 400 in FIG. 4 may represent an environment or subpart of an environment for which groupings are created, as described above. Each point on plot 400 may represent an identity within the chosen environment. As described above, security server 120 may develop identity groupings 410-430, each grouping containing identities with similar assigned privileges, used privileges, scopes of privileges, etc. Plot 400 may include boundary 440 that may represent the boundaries between each of identity groupings 410-430. In some embodiments, the points within each grouping may be illustrated using different colors, shapes, or sizes. For example, a point within Grouping 410 may be green, Grouping 420 may be red, and Grouping 430 may be blue. In some embodiments, plot 400 may be three dimensional.

In some embodiments, security server 120 may provide visual representations to another component of system 100, for example computing device 110. Computing device 110 may present a graphic user interface that displays visual representations of groupings. A user (e.g., a system administrator) may use the graphic user interface and visual representations to evaluate and/or select recommended groupings. Security server 120 may generate a visual representation for multiple different recommended sets of groupings, for example, groupings created using different vectors, different attributes, or different machine learning algorithms. Security server 120 may provide a visual representation to the administrator for each of the groupings, which may permit the administrator to choose between the recommended groupings using the visual representations.

At step 360, process 300 may include calculating a group score. Security server 120 may calculate a group score for each grouping generating in operation 350. The group score may be a quantitative value that represents the similarity of the identities within a particular grouping. For example, the group score may represent the average of the used privileges for each identity within the grouping.

FIGS. 5A and 5B illustrate exemplary group score calculations for an exemplary set of identified identities. FIG. 5A is a chart depicting used permissions for each of six different identities within an exemplary environment. As illustrated by the chart, each of the six identities actually used a subset of three of the permissions.

FIG. 5B depicts an exemplary group score formula 510 and exemplary group score calculations 520-540. Exemplary group score formula 510 may be used to calculate a group score that represents the average number of used privileges by each identity within a grouping out of the total privileges used in the group. Specifically, p represents the number of used privileges of a given identity. N represents the total number of unique privileges used by the identities within the grouping. M represents the number of identities within the grouping. For example, exemplary Grouping 1 may consist of all six identities A-F in FIG. 5A, each of which uses three privileges. The entire grouping uses twelve unique privileges 1-12. Thus, the group score 520 calculated using formula 510 for Group 1 is 0.25. Similarly, exemplary Grouping 2 may consist of identities A-D. Grouping 2 uses a total of eight of the twelve privileges, as illustrated by FIG. 5A. Thus, formula 510 may be used to calculate a group score 530 of 0.375 for Grouping 2. Similarly, group score 540 may be calculated using formula 510 for Grouping 3 of identities A and B.

Group scores may be used to compare groupings in order to create groupings with identities with the most similar used privileges. Creating groupings with the most similar used privileges may allow for more efficient privilege control of the system.

It is to be understood that formula 510 is merely an illustration of an exemplary group score. Various other ways to calculate a group score are possible as well. For example, in some embodiments, certain identities or privileges may be weighted more heavily than others.

In some embodiments, there may be a maximum number of groupings to be created for a given environment. The maximum groupings number may be generated by or stored on security server 120. In some embodiments, an administrator may be able to dynamically define the maximum number of groupings. For example, an environment may have a corresponding maximum groupings number of four. For that environment, security server 120 may generate a maximum of four different groupings.

In some embodiments, security server 120 may generate a set of groupings for each number groupings up to the grouping maximum for a given environment. For example, if an environment has a grouping maximum of five, security server 120 may generate sets of groupings with one grouping, two groupings, three groupings, four groupings, and five groupings. For each grouping, security server 120 may also generate a group score. As described below, with respect to step 370, security server 120 may continue to generate new groupings until a threshold group score is reached.

As described above, groupings, as well as group scores, may be displayed to a user for selection of groupings. Providing group scores with the groupings may facilitate better grouping selection by the user. In some embodiments, security server 120 may select groupings based on the calculated group scores. For example, security server 120 may select a set of groupings with the highest average group score.

At step 370, process 300 may include determining if the calculated group score is sufficient. Security server 120 may make the determination by comparing the group score to a threshold group score. The threshold group score may be defined or stored by security server 120. For example, security server 120 may set a threshold group score of 0.70. Thus, for the exemplary groupings illustrated by FIG. 5B, only Grouping 3 would exceed the threshold.

If the calculated group score does not exceed the threshold group score, process 300 may return to step 350 and generate a new grouping or set of groupings.

If the calculated group score meets or exceeds the threshold group score, process 300 may proceed to step 380. In some embodiments, security server 120 may designate the grouping as a least-privilege subset if the group score meets or exceeds the threshold score. In some embodiments, if the group score for a grouping exceeds the threshold group score, security server 120 may subdivide the grouping into smaller groupings. This may permit the security server 120 or the administrator to make finer adjustments to the privileges assigned to the grouped identities. Subdivision may also be preferable in situations when a grouping contains a large number of identities, but a high group score. The threshold group score for subdivision may be the same or different from the main threshold group score used to evaluate first level groupings.

In some embodiments, given a certain maximum group number, security server 120 may not be able to generate any groupings having a group score that meets the threshold. If no calculated group scores meet the threshold, security server 120 may be configured to select or recommend the grouping or groupings with the highest group scores, even if they do not meet the threshold group score.

At step 380, process 300 may include updating privileges of identities within a generated grouping. In some embodiments, security server 120 may be configured to automatically update privileges based on the generated grouping or groupings. In other embodiments, consistent with the discussion above, security server 120 may present the groupings to an administrator for selection of groupings. The administrator may then also choose to update privileges of the identities associated with the grouping or groupings. Security server 120 may update one or more of the privileges assigned to each identity within a grouping. For example, if each identity within a grouping has a certain assigned privilege that none of the identities has actually used, security server 120 may be configured to revoke the privilege from each identity. In other embodiments, security server 120 may generate a recommendation that privileges be updated.

In some embodiments, security server 120 may be configured to assign an updated set of privileges to the identities within a grouping. The updated privileges may be identical for each of the identities within the grouping. The privileges may be different from the existing allowed privileges for the identities before the update. In some embodiments, the updated privileges may be assigned based on a least-privilege policy.

As described above, security server 120 may be configured to identify identities from separate environments and generate groupings for the different sets of identities. In some embodiments, security server 120 may be configured to update privileges for the first grouping for the first environment. Security server 120 may also be configured to apply the same updated privileges to a second grouping generated for the second environment. In some embodiments, security server 120 may generate recommendation to apply the updated privileges of the first environment to the second environment.

In some embodiments, security server 120 may be configured to output the updated privileges to a machine learning system. The machine learning system may be configured to iteratively generate privilege vectors for the identities and generate additional groupings. The additional groupings may be used to assign subset of the identities with updated privileges.

In some embodiments, security server 120 may be configured to repeat over time any of steps 340-380 for an environment or an identity. For example, security server 120 may repeatedly generate different privilege vectors for the same identity. Security server 120 may also be configured to determine a trend based on the repetitions over time. For example, security server 120 may determine a trend with one of the privilege vectors generated for the identity. In some embodiments, security server 120 may be configured to adjust the updated privileges associated with the identity or a grouping based on the determined trend.

A potential use case of the disclosed embodiments is described below. It is understood that this use case is provided by way of example only and is not limiting of the present disclosure.

One potential implementation may be to manage privileges across a large organization's network. The organization may have multiple different departments (e.g., an R&D Department and a Legal Department) each of which may include multiple identities and corresponding permissions. The organization may use disclosed embodiments to group identities and control their privileges to limit the system's attack surface. Security server 120 may implement the disclosed embodiments across the organization's system, which may include a virtual computing environment 130 and multiple additional computing devices 110.

A security server 120 may identify each of the identities within the system. Security server 120 may also identify which identities are members of a specific department. Security server 120 may also identify identity data associated with each identity, for example, the privileges it has, its type, its physical location, or the resources it may act on. Security server 120 may develop a privilege vector for each identity, which may represent the privileges actually used by the identity and the identity data (e.g., operation 340 above). Security server 120 may then implement a machine learning technique to generate groupings of the identities based on the privilege vectors. In this example, security server 120 may generate one set of groupings for the R&D Department, another set of groupings for the Legal Department, and a third set of groupings for the remaining identities within the organization's system. Security server 120 may generate multiple sets of groupings for each environment and group scores for each grouping. Security server 120 may present each set of groupings and the corresponding group scores to an administrator, who may select a set of groupings for each environment. Security server 120 may also present visual representations of the groupings (e.g., as described with respect to FIG. 4 above). The administrator or security server 120 may then update the privileges of the identities within each grouping (e.g., operation 380 above).

Another potential implementation may be to provide a cloud-based identity management service. A company may give the service access to the identities contained within its system. The service may use a security server 120 to identify the identities, their used privileges, and any corresponding identity data. Security server 120 may then generate privilege vectors for each identity based on the used privileges and identity data. Based on the privilege vectors, security server 120 may generate groupings of the identities (e.g., operation 350 above). In some cases, security server 120 may provide recommended groupings and updated privileges back to the customer company for grouping selection. In other cases, security server 120 may select least privilege groupings based on generated group scores (e.g., operations 350-370 above). Based on the groupings, security server 120 may then automatically update the privileges associated with identities (e.g., operation 380 above). Over time, security server 120 may periodically update the privilege vectors and generate new or updated groupings based on the new privilege vectors. Accordingly, it may also update identity privileges based on the new or updated groupings.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for assessment of network identities, the operations comprising:
   identifying a plurality of network identities;
   identifying, for a plurality of privileges, whether the plurality of privileges have been actually used by the plurality of network identities over a period of time;
   identifying identity data associated with the plurality of network identities, the identity data indicating one or more attributes of the plurality of network identities;
   developing, based on whether the plurality of privileges have been actually used by the plurality of network identities over the period of time and on the identity data, a first plurality of multidimensional privilege vectors for the plurality of network identities, each of the first plurality of multidimensional privilege vectors corresponding to an identity from the plurality of network identities and expressing at least:
      whether each identity actually used the plurality of privileges over the period of time, and
      the one or more attributes of each identity; and
   triggering, based on the first plurality of multidimensional privilege vectors, a security action.

2. The non-transitory computer readable medium of claim 1, the operations further comprising developing a second plurality of multidimensional privilege vectors for the plurality of network identities.

3. The non-transitory computer readable medium of claim 2, wherein developing the second plurality of multidimensional privilege vectors is based on whether the plurality of privileges have been actually used by the plurality of network identities over a second period of time.

4. The non-transitory computer readable medium of claim 2, wherein developing the second plurality of multidimensional privilege vectors is based on second identity data associated with the plurality of network identities, the second identity data indicating one or more attributes of the plurality of network identities.

5. The non-transitory computer readable medium of claim 1, wherein the operation of identifying the plurality of network identities is dynamically configurable to allow different compositions of the plurality of network identities.

6. The non-transitory computer readable medium of claim 1, wherein the security action comprises implementing a security policy.

7. The non-transitory computer readable medium of claim 1, wherein the security action comprises generating at least one of a security recommendation or security alert.

8. The non-transitory computer readable medium of claim 1, wherein the security action comprises modifying an attribute of an identity.

9. The non-transitory computer readable medium of claim 1, wherein the security action comprises modifying, suspending, or revoking one or more privileges of an identity.

10. The non-transitory computer readable medium of claim 9, wherein the modifying, suspending, or revoking of one or more privileges is based on a security policy.

11. A computer-implemented method for assessment of network identities, the method comprising:
 identifying a plurality of network identities;
 identifying, for a plurality of privileges, whether the plurality of privileges have been actually used by the plurality of network identities over a period of time;
 identifying identity data associated with the plurality of network identities, the identity data indicating one or more attributes of the plurality of network identities;
 developing, based on whether the plurality of privileges have been actually used by the plurality of network identities over the period of time and on the identity data, a first plurality of multidimensional privilege vectors for the plurality of network identities, each of the first plurality of multidimensional privilege vectors corresponding to an identity from the plurality of network identities and expressing at least:
  whether each identity actually used the plurality of privileges over the period of time, and
  the one or more attributes of each identity; and
 triggering, based on the first plurality of multidimensional privilege vectors, a security action.

12. The computer-implemented method of claim 11, wherein the first plurality of multidimensional privilege vectors for the plurality of network identities correspond to a first network environment, and the method further comprises developing a second plurality of multidimensional privilege vectors for a second plurality of network identities in a second network environment.

13. The computer-implemented method of claim 12, wherein the security action comprises assigning updated privileges to a subset of identities of the first network environment.

14. The computer-implemented method of claim 13, wherein the security action comprises developing a recommendation to apply the updated privileges to one or more identities of the second network environment.

15. The computer-implemented method of claim 11, further comprising generating, based on the plurality of multidimensional privilege vectors, a plurality of groupings comprising subsets of the plurality of network identities.

16. The computer-implemented method of claim 15, wherein the security action comprises at least one of:
 modifying one or more of the plurality of groupings by changing the identities within the grouping; or
 adding, modifying, suspending, or revoking one or more privileges of the identities within the grouping.

17. The computer-implemented method of claim 11, further comprising:
 generating, based on the plurality of multidimensional privilege vectors, a first grouping comprising a single identity; and
 wherein the security action comprises suspending or revoking the privileges of the single identity.

18. The computer-implemented method of claim 11, further comprising generating a set of multidimensional privilege vectors associated with a first identity by repeating over time the step of developing the first plurality of multidimensional privilege vectors for the plurality of network identities.

19. The computer-implemented method of claim 18, further comprising comparing the set of multidimensional privilege vectors associated with the first identity.

20. The computer-implemented method of claim 19, wherein the security action comprises at least one of:
 generating, based on the comparison, a security recommendation; or
 adjusting, based on the comparison, privileges associated with the first identity.

* * * * *